(12) United States Patent
Yamashita et al.

(10) Patent No.: US 9,749,570 B2
(45) Date of Patent: Aug. 29, 2017

(54) IMAGING APPARATUS, METHOD OF DRIVING THE SAME, AND IMAGING SYSTEM

(71) Applicant: CANON KABUSHIKI KAISHA, Tokyo (JP)

(72) Inventors: Takanori Yamashita, Hachioji (JP); Yoshikazu Yamazaki, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 14/745,574

(22) Filed: Jun. 22, 2015

(65) Prior Publication Data

US 2016/0006967 A1 Jan. 7, 2016

(30) Foreign Application Priority Data

Jul. 3, 2014 (JP) ................................. 2014-137446

(51) Int. Cl.
*H04N 5/378* (2011.01)
*H04N 5/376* (2011.01)
*H04N 5/357* (2011.01)

(52) U.S. Cl.
CPC ............. *H04N 5/378* (2013.01); *H04N 5/357* (2013.01); *H04N 5/376* (2013.01)

(58) Field of Classification Search
CPC ......... H04N 5/378; H04N 5/357; H04N 5/376
See application file for complete search history.

(56) References Cited

U.S. PATENT DOCUMENTS

| 6,163,024 | A  | * | 12/2000 | Kozuka ............. H01L 27/14609 |
| | | | | 250/208.1 |
| 7,508,433 | B2 | | 3/2009 | Koseki et al. |
| 7,903,056 | B2 | | 3/2011 | Kawasaki et al. |
| 9,502,451 | B2 | * | 11/2016 | Yamashita ........ H01L 27/14643 |

FOREIGN PATENT DOCUMENTS

JP 2005-143078 A 6/2005

\* cited by examiner

*Primary Examiner* — Tony Ko
(74) *Attorney, Agent, or Firm* — Fitzpatrick, Cella, Harper & Scinto (57) ABSTRACT

Provided is an imaging apparatus, including: a driving circuit switching between a current supplying state and a current non-supplying state of the current sources included in column circuits in the respective columns; at least one second readout line to which image signals output from the column circuits in the respective columns are input; switches each having one terminal and another terminal; and a switch control circuit configured to output switch control signals for respectively controlling the switches to be turned on or off, each of the one terminals being connected to corresponding second readout line and each of the another terminals being connected commonly to an output line, in which, in a period in which the switch control signals for respectively controlling the switches to be turned on are output, the number of the current sources controlled to be in the current supplying state by the driving circuit is constant.

9 Claims, 6 Drawing Sheets

IMAGING APPARATUS, METHOD OF DRIVING THE SAME, AND IMAGING SYSTEM

BACKGROUND OF THE INVENTION

Field of the Invention

The present invention relates to an imaging apparatus, a method of driving the same, and an imaging system.

Description of the Related Art

The imaging apparatus disclosed in Japanese Patent Application Laid-Open No. 2005-143078 includes vertical signal lines and charge integrating amplifiers for respective pixel columns. Image signals readout from each pixel column via the vertical signal line and the charge integrating amplifier are output to a plurality of horizontal signal lines. The charge integrating amplifier is controlled to be in an ON state or a standby state by a horizontal scanning circuit. In Japanese Patent Application Laid-Open No. 2005-143078, it is disclosed that, with such configuration, in a period in which readout is not performed, the charge integrating amplifier may be switched to the standby state to reduce current consumption. According to the operation timing chart of the solid imaging apparatus in Japanese Patent Application Laid-Open No. 2005-143078, with the elapse of time, the number of operating charge integrating amplifiers is increased, and after becoming the same as the number of horizontal signal lines, the number of operating charge integrating amplifiers becomes constant.

However, when the number of operating charge integrating amplifiers is changed, currents supplied from a power source to the charge integrating amplifiers vary. At this time, waveforms of power supply voltages applied to the imaging apparatus may vary with time. This gives rise to a possibility that output voltages of a pixel circuit may vary. In a case where image signals are read while the output voltages of the pixel circuit vary due to such cause, deteriorated image signals may be read, and image quality may be deteriorated.

SUMMARY OF THE INVENTION

According to one embodiment of the present invention, there is provided an imaging apparatus, including: a plurality of pixel circuits arranged in matrix having rows and columns, each being configured to generate an image signal by photoelectric conversion; first readout lines arranged for respective columns, through which image signals output from the plurality of pixel circuits are transmitted; column circuits arranged for the respective columns, to which the image signals are input from the first readout lines; current sources included in the column circuits in the respective columns; a driving circuit configured to output column control signals for switching between a current supplying state and a current non-supplying state of the current sources included in the column circuits in the respective columns; at least one second readout line to which image signals output from the column circuits in the respective columns are input in response to the column control signals; switches each having one terminal and another terminal; and a switch control circuit configured to output switch control signals for respectively controlling the switches to be turned on or off, in which, each of the one terminals of the switches is connected to corresponding second readout line and each of the another terminals of the switches is connected commonly to an output line, and in which, in a period in which the switch control signals for respectively controlling the switches to be turned on are output, a number of the current sources controlled to be in the current supplying state by the driving circuit is constant.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Throughout the drawings, components having the same function are denoted by the same reference symbols, and a repetitive description thereof may sometimes be omitted. Note that, in the specification and the drawings, in regard to a pixel arrangement, a left and right direction of the drawing may sometimes be referred to as "row direction" or "horizontal", and an up and down direction of the drawing may sometimes be referred to as "column direction" or "vertical".

First Embodiment

Figure 1:
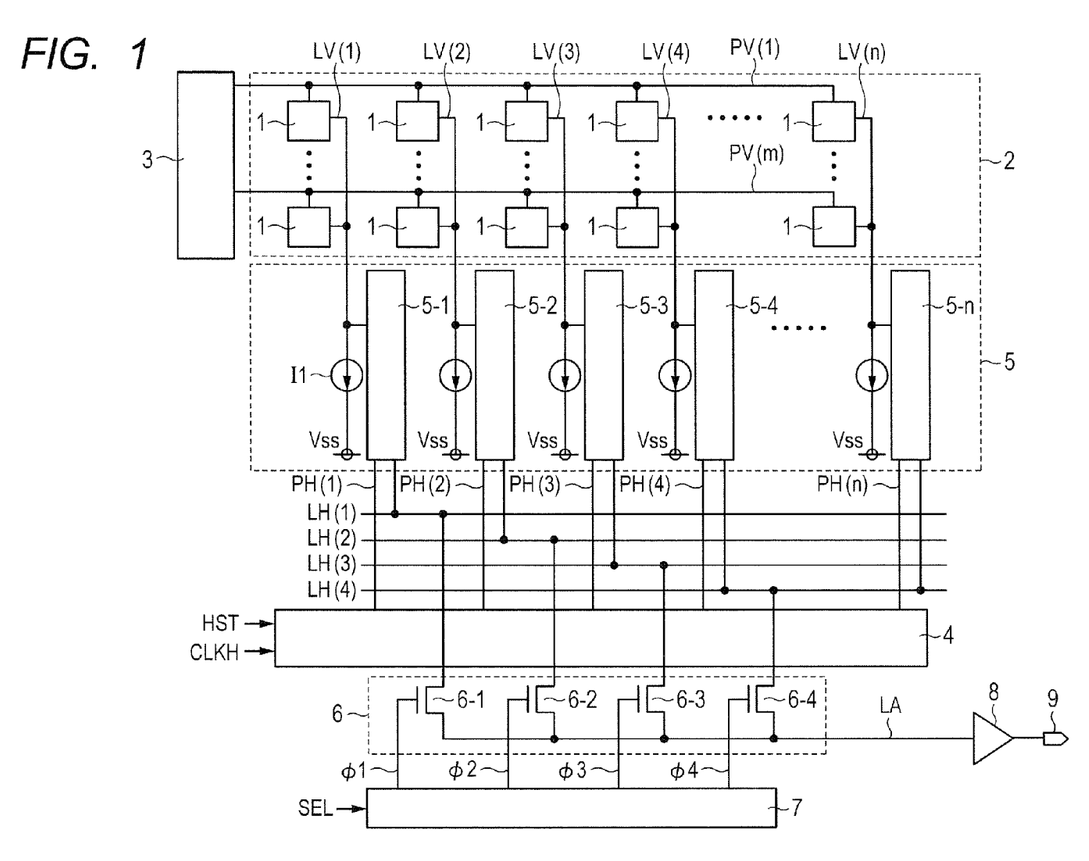
FIG. 1 is a block diagram for illustrating a configuration of an imaging apparatus according to a first embodiment of the present invention.

FIG. 1 is a block diagram for illustrating a configuration of an imaging apparatus according to a first embodiment of the present invention. The imaging apparatus in FIG. 1 includes a pixel portion 2, a vertical driving circuit 3, a horizontal driving circuit 4, a horizontal readout portion 5, a switch portion 6, a switch control circuit 7, and an output amplifier 8. The pixel portion 2 includes a plurality of pixel circuits 1 arranged in two-dimensional matrix. Each of the pixel circuits 1 is a circuit including a photoelectric converter, an amplifier circuit, and the like. The pixel circuits 1 generate electric charges corresponding to incident light by photoelectric conversion, convert the generated electric charges into voltage signals, and output the voltage signals as image signals. In this embodiment, the pixel portion 2 includes m rows by n columns (where m and n are natural numbers) of pixel circuits 1. The vertical driving circuit 3 supplies row control signals for selecting rows from which the image signals are read to the pixel circuits 1 via row control signal lines PV(1), PV(2), . . . , and PV(m) provided for respective rows of the pixel portion 2.

The pixel circuits 1 are connected to first readout lines (hereinafter referred to as "vertical readout lines") LV(1), LV(2), . . . , and LV(n) provided for respective columns of the pixel portion 2. The vertical readout lines LV(1), LV(2), . . . , and LV(n) of the respective columns are connected to the horizontal readout portion 5. In other words, the image signals generated by the pixel circuits 1 are transmitted to the horizontal readout portion 5 via the vertical readout lines LV(1), LV(2), . . . , and LV(n).

The horizontal readout portion 5 includes a plurality of column circuits (hereinafter referred to as "horizontal readout circuits") 5-1, 5-2, . . . , and 5-*n*, and a plurality of current sources I1. The vertical readout lines LV(1), LV(2), . . . , and LV(n) are connected to the horizontal readout circuits 5-1, 5-2, . . . , and 5-*n*, respectively. Also connected to the vertical readout lines LV(1), LV(2), . . . , and LV(n) are the current sources I1 for supplying currents flowing from the pixel circuits 1 to a power source Vss, respectively.

Figure 2:
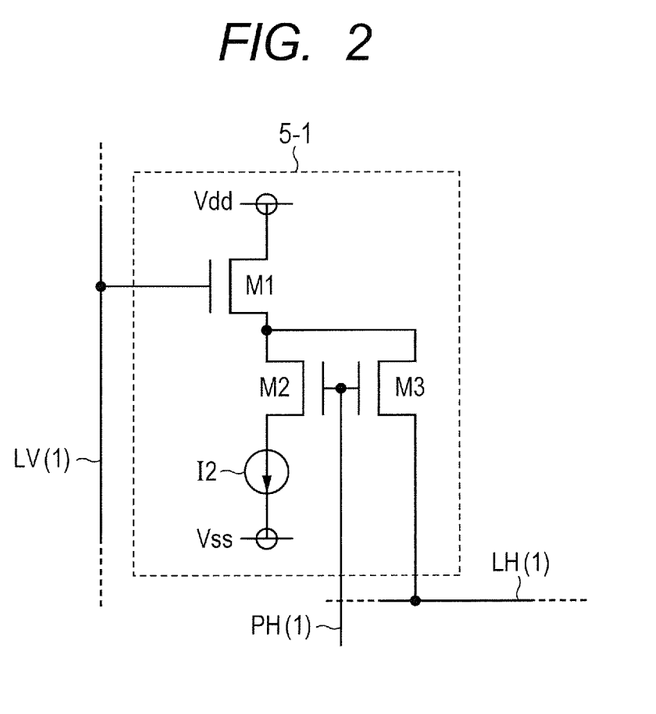
FIG. 2 is a circuit diagram of a horizontal readout circuit according to the first embodiment of the present invention.

FIG. 2 is a circuit diagram of the horizontal readout circuit 5-1 according to the first embodiment of the present invention. Now, the horizontal readout circuit 5-1 arranged in the first column is described, but the same is true for the horizontal readout circuits 5-2, . . . , and 5-*n* in the other columns. Note that, in FIG. 2, a power source Vdd and the power source Vss are illustrated, and a voltage of the power source Vdd is higher than a voltage of the power source Vss.

The horizontal readout circuit 5-1 includes an input transistor M1, the first and the second switches (hereinafter referred to as "switch transistors") M2 and M3, and a current source I2. The transistors are hereinafter n-type MOSFETs, but the present invention is not limited thereto. The input transistor M1 has a drain connected to the power source Vdd, and a gate connected to the vertical readout line LV(1). The input transistor M1 has a source connected to a drain of the switch transistor M2 and a drain of the switch transistor M3.

To gates of the switch transistors M2 and M3 connected in common, a column control signal PH(1) is supplied from the driving circuit (hereinafter referred to as "horizontal driving circuit") 4. Operation timing of the horizontal driving circuit 4 is controlled by a start signal HST, a clock signal CLKH, and the like, which are supplied from a timing control unit and the like external to the imaging apparatus.

The switch transistor M2 has a source connected to one terminal of the current source I2, which is connected to the power source Vss at the other terminal of the current source I2. The switch transistor M3 has a source connected to a second readout line (hereinafter referred to as "horizontal readout line") LH(1). When the column control signal PH(1) becomes an H level, image signals of the selected column are read out to the horizontal readout line LH(1) via the horizontal readout circuit 5-1. In other words, the horizontal readout circuit 5-1 may read voltages of the vertical readout line LV(1) out to the horizontal readout line LH(1) in response to the column control signal PH(1). More specifically, a control is performed so that, when the column control signal PH becomes the H level, the current source becomes a current supplying state, and when the column control signal PH becomes an L level, the current source becomes a current non-supplying state.

Note that, in this embodiment, four horizontal readout lines LH(1), LH(2), LH(3), and LH(4) are arranged, and each of the horizontal readout circuits 5-1, 5-2, . . . , and 5-*n* is connected to any one of the horizontal readout lines LH(1), LH(2), LH(3), and LH(4). For example, the horizontal readout circuits 5-1, and 5-4 may be connected to the horizontal readout lines LH(1), . . . , and LH(4), respectively, and the horizontal readout circuits 5-5, . . . , and 5-8 may be connected again to the horizontal readout lines LH(1), . . . , and LH(4), respectively. In this manner, the horizontal readout circuits 5-1, 5-2, . . . , and 5-*n* may be configured to be connected to the horizontal readout lines LH(1), LH(2), LH(3), and LH(4) under a periodic rule, and readout may be performed under a simple rule.

The switch portion 6 includes switches 6-1, 6-2, 6-3, and 6-4. The switches 6-1, 6-2, 6-3, and 6-4, each having one terminal and another terminal, are connected at one terminal to the horizontal readout lines LH(1), LH(2), LH(3), and LH(4), respectively, and are connected in common at the other terminal to an output line (hereinafter referred to as "common output line") LA. The switches 6-1, 6-2, 6-3, and 6-4 are controlled to be turned on or off by switch control signals φ1, φ2, φ3, and φ4 from the switch control circuit 7. Operation timing of the switch control circuit 7 is controlled by a driving signal SEL and the like. The image signals read out to the common output line LA are amplified by the output amplifier 8 and output from an external terminal 9.

Note that, a configuration of the horizontal readout circuits 5-1, 5-2, . . . , and 5-*n* is not limited to the circuit configuration illustrated in FIG. 2. Various configurations may be applied as long as currents supplied to the circuits may be controlled by controlling currents flowing through constant current sources.

Figure 3:
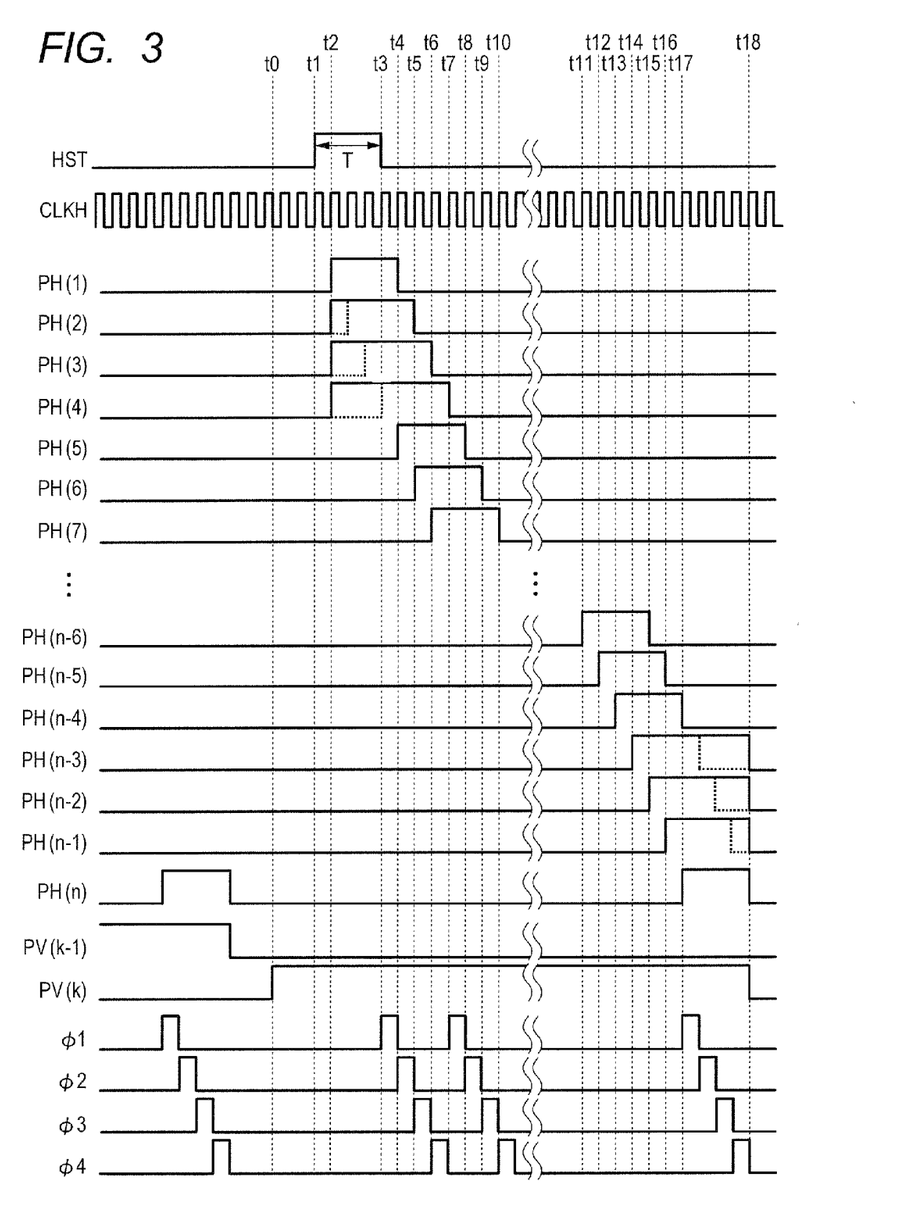
FIG. 3 is a timing chart for illustrating operation of the imaging apparatus according to the first embodiment of the present invention.

FIG. 3 is a timing chart for illustrating operation of the imaging apparatus in the first embodiment. Operation in a case where image signals output from the k-th row (where k is a natural number of 1 or more and m or less) of the pixel portion 2 are read in order from the 1st column is described. Note that, in FIG. 3 and the following description, reference symbols of the signal lines may sometimes be used to indicate control signals flowing through the signal lines.

At time t0, a signal output from the vertical driving circuit 3 via the row control signal line PV(k) is changed from the L level to the H level to select pixel circuits 1 in the k-th row.

At time t1, the start signal HST for controlling the horizontal driving circuit 4 is changed from the L level to the H level. The horizontal driving circuit 4 starts, with the start signal HST becoming the H level as a trigger, an operation of outputting column control signals PH(1), PH(2), . . . , and PH(n) to the horizontal readout circuits 5-1, 5-2, . . . , and 5-*n*.

The horizontal driving circuit 4 operates as a shift register for sequentially shifting an input start signal HST in accordance with the clock signal CLKH (clock width: T1) to generate and output the column control signals PH(1), PH(2), . . . , and PH(n). When the start signal HST (clock width: T=4×T1) becomes the H level, at time t2 after an elapse of 1 clock, the horizontal driving circuit 4 outputs the column control signal PH(1), which is obtained by delaying the start signal HST by 1 clock, to the horizontal readout circuit 5-1. Then, to the horizontal readout circuits, column control signals, which are obtained by sequentially shifting by 1 clock each, are output in a similar manner. More specifically, an operation is performed so that, for the i-th column, at a time after an elapse of a period corresponding to i clocks from the start, the column control signal PH(i) is output to the horizontal readout circuit 5-*i*. It should be noted, however, that in a period from time t2 to time t7 immediately after the start and a period from time t14 to time t18 near the last column, instead of the regular operation in which only the signals obtained by shifting the start signal HST described above are output, an exceptional operation is performed. More specifically, the column control signals PH(2), PH(3), PH(4), PH(n−3), PH(n−2), and PH(n−1) are output at operation timing different from that described above. This exceptional operation is described in detail.

When the start signal HST becomes the H level at time t1, at time t2 after an elapse of 1 clock, the column control signals PH(1), PH(2), PH(3), and PH(4) are changed from the L level to the H level all at once. Thereafter, the column control signals PH(1), PH(2), PH(3), and PH(4) are changed to the L level at time t4, time t5, time t6, and time t7, respectively. In other words, H-level periods of the column control signals PH(1), PH(2), PH(3), and PH(4) are T, (T+T1), (T+2×T1), and (T+3×T1), respectively. For the column control signal PH(5) and subsequent column control signals: PH(5), PH(6), . . . , and PH(n−4), the above-mentioned regular operation is performed, and widths of H-level periods of those column control signals are all T.

Such column control signals PH(2), PH(3), and PH(4) may be formed of, for example, logical sums of the column control signal PH(1) obtained by shifting the start signal HST by 1 clock, and signals obtained by an operation of shifting the start signal HST by 2 to 4 clocks, respectively.

The column control signal PH(n−3), the column control signal PH(n−2), the column control signal PH(n−1), and the column control signal PH(n) are changed from the L level to the H level at time t14, time t15, time t16, and time t17, respectively. Thereafter, at time t18, the column control signals PH(n−3), PH(n−2), PH(n−1), and PH(n) become the L level all at once. In other words, H-level periods of the column control signals PH(n−3), PH(n−2), PH(n−1), and PH(n) are (T+3×T1), (T+2×T1), (T+T1), and T, respectively.

Along with the above-mentioned operation, in a period from time t3 to time t4, the switch control signal φ1 becomes the H level. This causes the image signals output from the pixel circuits 1 in the first column to be read out to the common output line LA via the horizontal readout line LH(1) and the switch 6-1. The image signals of the first column read out to the common output line LA are output from the external terminal 9 to an external circuit via the output amplifier 8.

In a period from time t4 to time t5, the switch control signal φ3 is changed to the H level. This causes the image signals of the second column to be read in a similar manner. At and after time t5, the image signals are sequentially read in a similar manner.

As described above, the column control signals PH(2), PH(3), PH(4), PH(n−3), PH(n−2), and PH(n−1) have the H-level periods that are extended to be longer than the other column control signals. In this manner, in all periods from time t2 to time t18, four column control signals are always at the H level, and the number of current sources I2 that operate simultaneously is fixed at four. An effect obtained with this configuration is described.

Operations of the column control signals PH(2), PH(3), PH(4), PH(n−3), PH(n−2), and PH(n−1) indicated by the broken lines in FIG. 3 are operation timing in a case where the exceptional operation is not performed in the operation periods immediately after the start and near the last column. In this case, in periods of time t2 to time t3 and time t17 to time t18, the number of column control signals is smaller than four, and hence the number of operating current sources I2 varies. In contrast, in this embodiment, at and after time t2, four current sources I2 always operate, and a total value of amounts of currents flowing through the horizontal readout circuits is constant. With this, in a period before time t3 when readout of the image signals of the first column is started, the currents supplied by the current sources I2 are stabilized, and thereafter, the image signals may be read in a state in which the amounts of the currents are constant. Therefore, variations in output signals due to a change in number of operating current sources I2 are suppressed, and readout accuracy of the image signals is improved. Note that, when setting time of the currents supplied by the current sources I2 is taken into consideration, it is desired for the number of operating current sources I2 to be constant at least 1 clock before time t3.

Figure 4A:
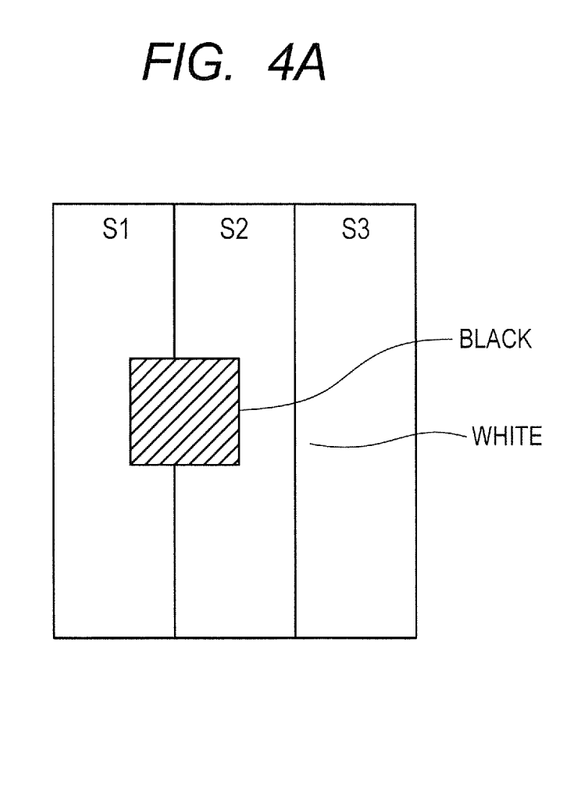
FIGS. 4A and 4B are diagrams for illustrating an example of an image captured by using the imaging apparatus according to the first embodiment of the present invention.
Figure 4B:
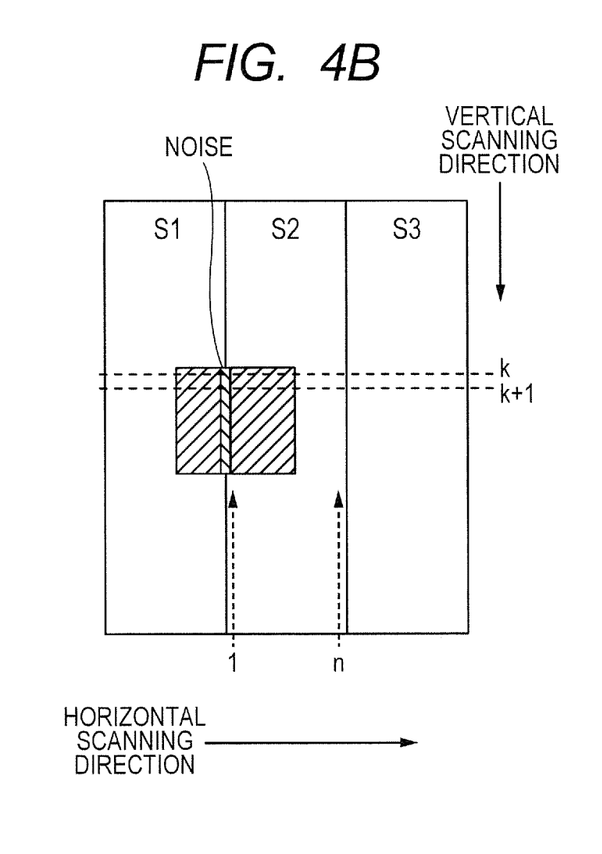

FIG. 4A and FIG. 4B are diagrams for illustrating an example of an image captured by using the imaging apparatus according to this embodiment. FIG. 4A and FIG. 4B are diagrams of images, which are captured by an imaging apparatus having a configuration in which three imaging apparatus according to this embodiment are arranged in a horizontal direction, and obtained by combining image regions S1, S2, and S3 respectively captured by the imaging apparatus. Amounts of light that enters the imaging apparatus correspond to a black level in a rectangular region around a boundary of the image regions S1 and S2, and to a white level in the other regions. Moreover, as indicated by the arrows in FIG. 4A and FIG. 4B, scanning in the horizontal direction is performed continuously from left to right across the three imaging apparatus, and scanning in the vertical direction is performed from top to bottom. Note that, in this embodiment, the case where three imaging apparatus are arranged is exemplified, but the number of imaging apparatus may be two, or a plurality of four or more.

FIG. 4A is a diagram of an image captured in a case where the imaging apparatus according to this embodiment is used, and FIG. 4B is a diagram of an image captured in a case where the imaging apparatus in which the exceptional operation is not performed in the periods immediately after the start and near the last column (broken lines in FIG. 3) is used.

In the diagram of the image illustrated in FIG. 4B, around the n-th column of the image region S1 and the first column of the image region S2, which are at the boundary in transitioning from the image region S1 to the image region S2 during the horizontal scanning, linear noise extending in the vertical direction is generated in a portion that is originally intended to be a black image. As described above, in the readout around the first column and the n-th column, the number of operating current sources I2 varies, which in turn varies the total value of the amounts of the currents flowing through the horizontal readout circuits. The read image signals deviate from actual values due to the changes in amounts of the currents, and hence the image containing the noise around the n-th column of the image region S1 and the first column of the image region S2 is captured. On the other hand, in FIG. 4A, the number of operating current sources I2 is constant, and hence the noise is suppressed.

As described above, according to this embodiment, in the readout period, the number of operating current sources I2 is constant. This causes the total value of the amounts of the currents flowing through the horizontal readout circuits to be constant, with the result that the noise of the read image signals is reduced, which enables high-quality image capturing. Moreover, even in the case where the imaging apparatus according to this embodiment is configured by arranging the plurality of the imaging apparatus in the horizontal direction, the noise that can be generated around the boundary portion of the imaging apparatus is reduced.

In this embodiment, the case where the number of horizontal readout lines is four is exemplified. However, the present invention is not limited thereto, and the number may be any number of one or more. In a case where the number of horizontal readout lines is N, operation timing may be set so that the number of current sources I2 in the horizontal readout circuits that operate in the periods of time t2 to time t3 and time t17 to time t18 is N.

In this embodiment, the three column control signals PH(2), PH(3), and PH(4) are configured to be the logical sums of the column control signal PH(1), which is obtained by shifting the start signal HST by 1 clock, and signals obtained by the operation of shifting the start signal HST by 2 to 4 clocks, respectively. However, the present invention is not limited to this embodiment, and may be operated with a different control signal pattern, as long as the image signals may be read in the state in which the variations in currents supplied by the current sources I2 are sufficiently stabilized.

The above description has a precondition that the pixel portion 2 has a plurality of rows of the pixel circuits 1, but the number of rows may be one. In this case, the vertical driving circuit 3 is omitted. When the number of rows is one, the imaging apparatus to which this embodiment is applied is a line sensor in which the pixel circuits 1 are arranged in one dimension. In this case also, a similar effect is obtained.

Second Embodiment

Figure 5:
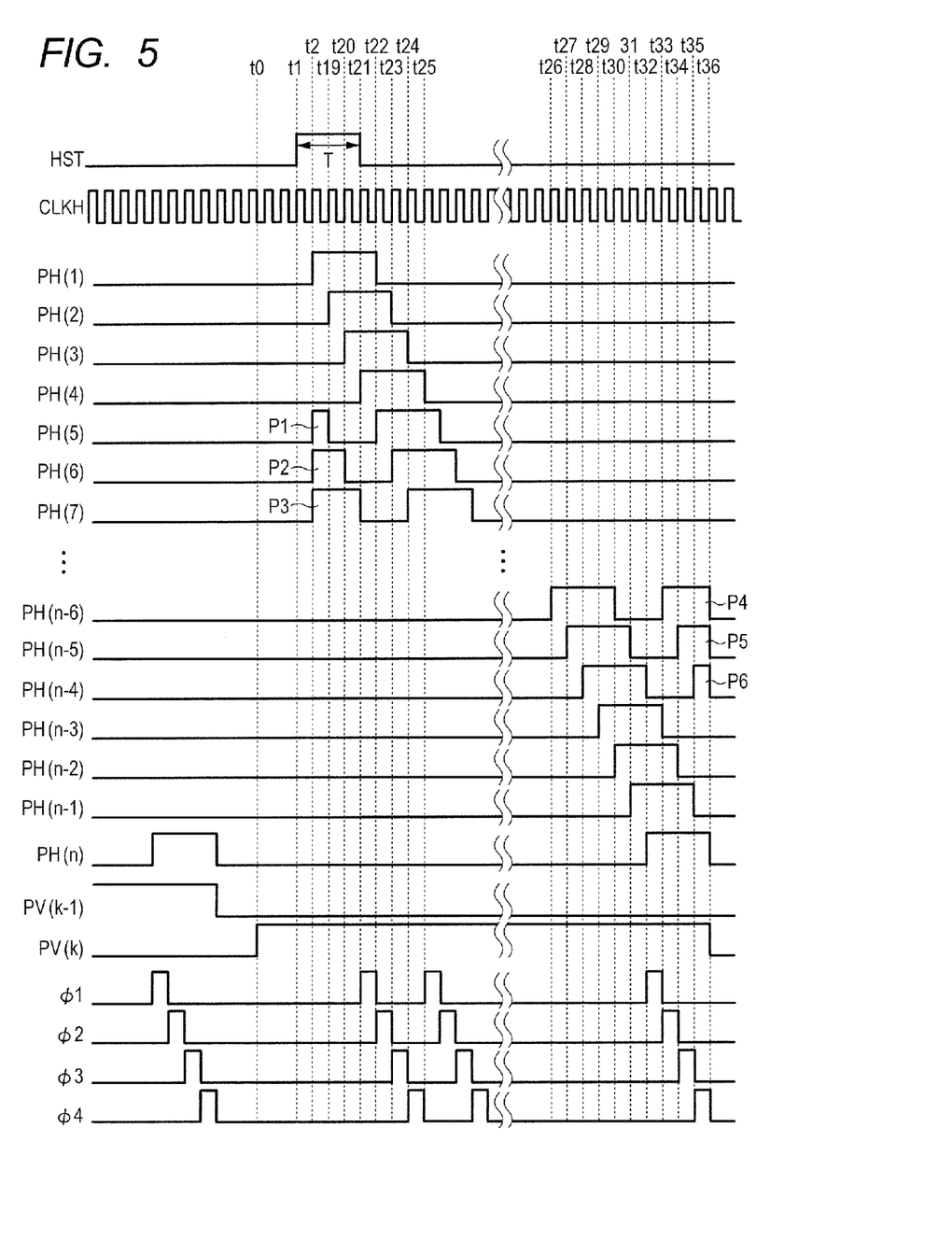
FIG. 5 is a timing chart for illustrating operation of an imaging apparatus according to a second embodiment of the present invention.

FIG. 5 is a timing chart for illustrating operation of an imaging apparatus according to a second embodiment of the present invention. Circuit configurations according to this embodiment are similar to those in the first embodiment illustrated in FIG. 1 and FIG. 2, and hence a description thereof is omitted. Operation timing in the second embodiment is described in terms of differences from the first embodiment.

In the first embodiment, the H-level periods of the column control signals PH(2), PH(3), PH(4), PH(n−3), PH(n−2), and PH(n−1) are extended so that the number of operating current sources I2 is constant at each time. In contrast, in this embodiment, driving pulses P1 to P6 are respectively added to the column control signals PH(5), PH(6), PH(7), PH(n−6), PH(n−5), and PH(n−4) so that the number of operating current sources I2 is constant. Note that, the driving pulses P1 to P6 may be supplied from an external circuit to the horizontal driving circuit 4 independently of the start signal HST, which is used to generate the column control signals, for example.

At time t2, along with the column control signal PH(1), the column control signals PH(5), PH(6), and PH(7) become the H level all at once. The column control signal PH(5) becomes the L level at time t19, the column control signal PH(6) becomes the L level at time t20, and the column control signal PH(7) becomes the L level at time t21. Thereafter, the column control signal PH(n−6), the column control signal PH(n−5), and the column control signal PH(n−4) become the H level at time t33, time t34, and time t35, respectively, when readout is performed around the last column. Then, at time t36, along with the column control signal PH(n) for the last row n, PH(n−6), PH(n−5), and PH(n−4) become the L level.

As described above, the column control signals PH(1) to PH(n) in this embodiment are obtained by adding the driving pulses P1 to P6 to signals obtained by an operation of sequentially shifting the start signal HST for each clock.

As in the first embodiment, also in this embodiment, at and after time t2, four current sources I2 always operate. Therefore, for a reason similar to that described in the first embodiment, the total value of the amounts of the currents flowing through the horizontal readout circuits is constant, with the result that the noise of the read image signals is reduced, which enables high-quality image capturing.

Note that, in this embodiment, the driving pulses P1, P2, P3, P4, P5, and P6 are added to the column control signals PH(5), PH(6), PH(7), PH(n−6), PH(n−5), and PH(n−4), respectively, but the present invention is not limited thereto. The form of the driving pulses may be different from the above-mentioned example, and driving pulses may be added to other column control signals. For example, in this embodiment, in the period from time t2 to time t19, the H level signal is supplied as the column control signal PH(5). In the case of such operation, the horizontal readout line LH(1) is driven by two columns, and the total amount of the currents may not match perfectly. In this case also, the effect of the present invention may be obtained. Alternatively, the driving pulses in FIG. 5 may be supplied so that control signals supplied to the gates of the switch transistors M2 and M3 are divided and that the switch transistor M2 is not turned on in the period of time t2 to time t19. Still alternatively, control pulses in the period of time t2 to time t21 in FIG. 5 may be shifted by one column each. More specifically, the signal that has been supplied to the column control signal PH(5) may be supplied to the column control signal PH(6), the signal that has been supplied to the column control signal PH(6) may be supplied to the column control signal PH(7), and the signal that has been supplied to the column control signal PH(7) may be supplied to the column control signal PH(8).

Third Embodiment

Figure 6:
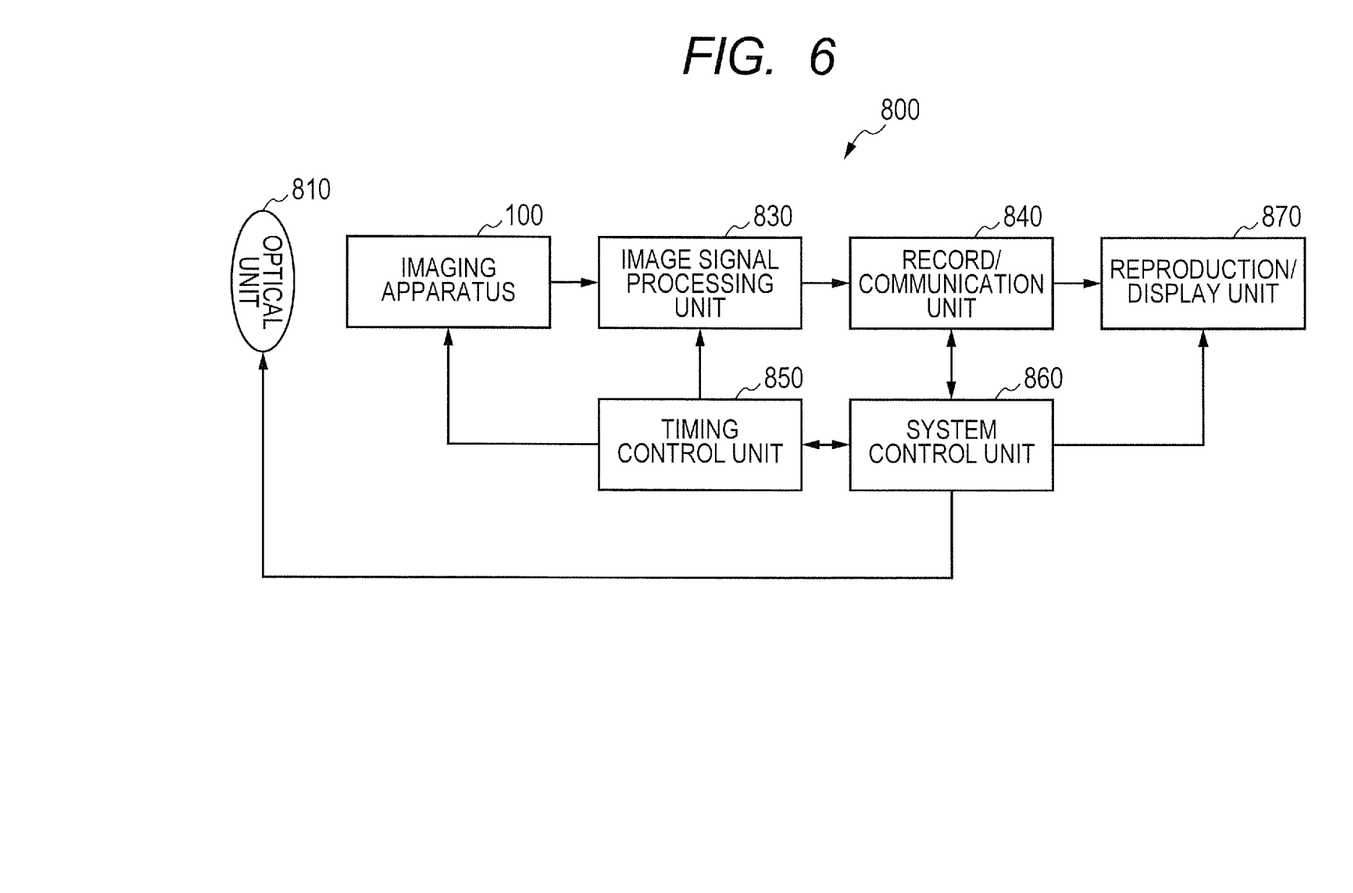
FIG. 6 is a block diagram of an imaging system according to a third embodiment of the present invention.

FIG. 6 is a diagram for illustrating a configuration example of an imaging system 800 according to a third embodiment of the present invention. The imaging system 800 includes, for example, an optical unit 810, the imaging apparatus 100, an image signal processing unit 830, a record/communication unit 840, a timing control unit 850, a system control unit 860, and a reproduction/display unit 870. For the imaging apparatus 100, the imaging apparatus according to each of the first and second embodiments may be used.

The optical unit 810, which is an optical system such as a lens, images light from a subject on the pixel portion 2 of the imaging apparatus 100, in which the plurality of pixel circuits 1 are arranged in one-dimensional line or in two-dimensional matrix, to form an image of the subject. The imaged light from the subject is converted into an electric signal by the photoelectric conversion in each of the pixel circuits 1. The imaging apparatus 100 outputs signals corresponding to the light imaged on the pixel portion 2 at timing based on a signal from the timing control unit 850. The signals output from the imaging apparatus 100 are input to the image signal processing unit 830, and the image signal processing unit 830 performs signal processing in accordance with a method defined by a program or the like. Signals obtained by the processing in the image signal processing unit 830 are sent as image data to the record/communication unit 840. The record/communication unit 840 sends the signals for forming an image to the reproduction/display unit 870 to cause the reproduction/display unit 870 to reproduce/display a moving image or a still image. The record/communication unit 840 also communicates to/from the system control unit 860 in response to the signal from the image signal processing unit 830, and in addition, performs an operation of recording the signals for forming the image in a recording medium (not shown).

The system control unit 860 performs centralized control on operation of the imaging system 800, and controls driving of the optical unit 810, the timing control unit 850, the record/communication unit 840, and the reproduction/display unit 870. The system control unit 860 also includes, for example, a storage device (not shown) which is a recording medium, on which a program necessary for controlling the operation of the imaging system and the like are recorded.

The system control unit 860 also supplies, for example, a signal for switching a driving mode in response to an operation by a user in the imaging system. Specific examples include changing the row to be read or a row to be reset, changing an angle of view accompanying electronic zoom, shifting the angle of view accompanying electronic image stabilization, and the like. The timing control unit 850 controls timing for driving the imaging apparatus 100 and the image signal processing unit 830 under the control of the system control unit 860.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-137446, filed Jul. 3, 2014, which is hereby incorporated by reference herein in its entirety.

What is claimed is:

1. An imaging apparatus, comprising:
   a plurality of pixel circuits arranged in matrix having rows and columns, each being configured to generate an image signal by photoelectric conversion;
   first readout lines arranged for respective columns, through which image signals output from the plurality of pixel circuits are transmitted;
   column circuits arranged for the respective columns, to which the image signals are input from the first readout lines;
   current sources included in the column circuits in the respective columns;
   a driving circuit configured to output column control signals for switching between a current supplying state and a current non-supplying state of the current sources included in the column circuits in the respective columns;
   at least one second readout line to which the image signals output from the column circuits in the respective columns are input in response to the column control signals;
   switches each having one terminal and another terminal; and
   a switch control circuit configured to output switch control signals for respectively controlling the switches to be turned on or off,
   wherein each of the one terminals of the switches is connected to corresponding second readout line and each of the another terminals of the switches is connected commonly to an output line, and
   wherein, in a period in which the switch control signals for respectively controlling the switches to be turned on are output, a number of the current sources controlled to be in the current supplying state by the driving circuit is constant, and some current sources are controlled to be in the current supplying state while others of the current sources are controlled to be in the current non-supplying state.

2. The imaging apparatus according to claim 1,
   wherein the driving circuit outputs the column control signals so as to change a combination of operating current sources for each clock of an input clock signal, and
   wherein the number of current sources in the current supplying state is constant at least 1 clock before the period in which the switch control signals are output.

3. The imaging apparatus according to claim 1, wherein the column control signals for controlling the number of current sources in the current supplying state to be constant are generated by logical sums of a plurality of the column control signals for column circuits in different columns.

4. The imaging apparatus according to claim 1, wherein the column control signals for controlling the number of current sources in the current supplying state to be constant are generated by logical sums of a column control signal for a column circuit in one column and driving pulses supplied independently of the column control signal.

5. An imaging apparatus, comprising a plurality of the imaging apparatuses according to claim 1 arranged side by side.

6. The imaging apparatus according to claim 5, wherein the plurality of the imaging apparatuses arranged side by side are scanned continuously across the plurality of the imaging apparatuses, and operate simultaneously.

7. The imaging apparatus according to claim 1, wherein each of the column circuits in the respective columns comprises:
   an amplifier circuit configured to readout signals to the at least one second readout line;
   a current source configured to supply a current to the amplifier circuit;
   a first switch configured to switch the current source between the current supplying state and the current non-supplying state; and
   a second switch configured to switch a connected state and a disconnected state of the amplifier circuit with respect to the at least one second readout line,
   wherein the first switch and the second switch arranged in one column circuit are controlled with a common control signal.

8. The imaging system, comprising the imaging apparatus according to claim 1.

9. A method of driving an imaging apparatus,
   the imaging apparatus comprising:
      a plurality of pixel circuits arranged in matrix having rows and columns, each being configured to generate an image signal by photoelectric conversion;
      first readout lines arranged for respective columns, through which image signals output from the plurality of pixel circuits are transmitted;
      column circuits arranged for the respective columns, to which the image signals are input from the first readout lines;
      current sources included in the column circuits in the respective columns;
      at least one second readout line to which the image signals output from the column circuits in the respective columns are input; and
      switches each having one terminal and another terminal, wherein each of the one terminals of the switches is connected to corresponding second readout line and each of the another terminals of the switches is connected commonly to an output line,
   the method comprising:
      controlling, in a period in which the respective switches are controlled to be turned on, a number of the current sources in a current supplying state to be constant,
      wherein some of the current sources are controlled to be in the current supplying state while others of the current sources are controlled to be in the current non-supplying state.

* * * * *